US012247491B2

(12) United States Patent
Fradet et al.

(10) Patent No.: US 12,247,491 B2
(45) Date of Patent: Mar. 11, 2025

(54) ABRADABLE COATING

(71) Applicant: SAFRAN AIRCRAFT ENGINES, Paris (FR)

(72) Inventors: Guillaume Fradet, Moissy-Cramayel (FR); Laurent Paul Dudon, Moissy-Cramayel (FR); Serge Georges Vladimir Selezneff, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/630,031

(22) PCT Filed: Jul. 22, 2020

(86) PCT No.: PCT/FR2020/051333
§ 371 (c)(1),
(2) Date: Jan. 25, 2022

(87) PCT Pub. No.: WO2021/019154
PCT Pub. Date: Feb. 4, 2021

(65) Prior Publication Data
US 2022/0282633 A1 Sep. 8, 2022

(30) Foreign Application Priority Data
Jul. 26, 2019 (FR) ...................................... 19 08492

(51) Int. Cl.
*F01D 11/12* (2006.01)
*C23C 4/04* (2006.01)
*C23C 4/129* (2016.01)

(52) U.S. Cl.
CPC .............. *F01D 11/122* (2013.01); *C23C 4/04* (2013.01); *C23C 4/129* (2016.01); *F05D 2230/311* (2013.01); *F05D 2300/611* (2013.01)

(58) Field of Classification Search
CPC .......... F01D 11/12; F01D 11/122; C23C 4/04; C23C 4/06; C23C 4/11; C23C 4/12;
(Continued)

(56) References Cited

U.S. PATENT DOCUMENTS 4,566,700 A * 1/1986 Shiembob ............ F01D 11/122 277/922
4,867,639 A * 9/1989 Strangman ............. F01D 11/12 428/117
(Continued)

FOREIGN PATENT DOCUMENTS

BE 897 337 11/1983
CN 102787290 A 11/2012
(Continued)

OTHER PUBLICATIONS

Eunsung Park, et al., "Graded coating of hydroxyapatite and titanium by atmospheric plasma spraying" Materials Letters, vol. 40, No. 5, 1999, pp. 228-234, XP004256230. (Year: 1999).*
(Continued)

*Primary Examiner* — Brian P Wolcott
(74) *Attorney, Agent, or Firm* — Oblon, McClelland, Maier & Neustadt, L.L.P.

(57) ABSTRACT

An abradable coating for a turbomachine, as well as a turbomachine module and a turbomachine including such an abradable coating, the abradable coating including, with a content of greater than 50% by volume, an inorganic compound whose Mohs hardness is less than 6 and whose melting temperature is greater than 900° C.

21 Claims, 3 Drawing Sheets

(58) Field of Classification Search
CPC ..... C23C 4/123; C23C 4/129; F05D 2300/11; F05D 2300/17–182; F05D 2300/30
See application file for complete search history.

(56) References Cited

U.S. PATENT DOCUMENTS

| | | | | |
|---|---|---|---|---|
| 5,196,471 | A * | 3/1993 | Rangaswamy | C23C 4/04 428/404 |
| 5,536,022 | A * | 7/1996 | Sileo | F01D 11/122 415/174.4 |
| 5,780,116 | A * | 7/1998 | Sileo | F01D 11/122 427/455 |
| 9,581,041 | B2 * | 2/2017 | Sinatra | F01D 11/122 |
| 10,267,174 | B2 * | 4/2019 | Liu | C22C 1/08 |
| 10,669,878 | B2 * | 6/2020 | Liu | C22C 9/06 |
| 11,149,354 | B2 * | 10/2021 | Anand | C23C 4/073 |
| 2008/0057326 | A1 | 3/2008 | Schlichting et al. | |
| 2016/0245110 | A1 * | 8/2016 | Strock | F01D 5/288 |
| 2017/0306783 | A1 * | 10/2017 | Grande | C23C 4/131 |
| 2019/0284673 | A1 * | 9/2019 | Landwehr | C23C 28/347 |
| 2023/0089114 | A1 * | 3/2023 | Fradet | C23C 4/04 |

FOREIGN PATENT DOCUMENTS

| | | | | |
|---|---|---|---|---|
| CN | 104988455 A | | 10/2015 | |
| CN | 105039894 A | | 11/2015 | |
| CN | 105689230 A | | 6/2016 | |
| CN | 108785750 A | * | 11/2018 | A61L 27/32 |
| EP | 0 487 273 A1 | | 5/1992 | |
| FR | 2.048.433 | | 3/1971 | |
| JP | 2001-59151 A | | 3/2001 | |
| KR | 10-1576132 B1 | | 12/2015 | |

OTHER PUBLICATIONS

International Search Report issued Nov. 17, 2020 in PCT/FR2020/051333 filed Jul. 22, 2020, 3 pages.

Preliminary French Search Report issued on Apr. 9, 2020 in French Patent Application No. 19 08492 filed Jul. 26, 2019, 3 pages (with Translation of Category).

Eunsung Park, et al., "Graded coating of hydroxyapatite and titanium by atmospheric plasma spraying", Materials Letters, vol. 40, No. 5, 1999, pp. 228-234, XP004256230.

Amardeep Singh, et al, "Influence of post coating heat treatment on microstructural, mechanical and electrochemical corrosion behaviour of vacuum plasma sprayed reinforced hydroxyapatite coatings", Journal of the Mechanical Behavior of Biomedical Materials, vol. 85 , 2018, pp. 20-36, XP085711475.

Combined Chinese Office Action and Search Report issued Jun. 25, 2023 in Chinese Application 202080053816.4, (submitting English translation only), 14 pages.

Ma et al., "Brief tutorial on tolerance fitting and measurement", China Ocean University Press, 2011, pp. 1-3.

* cited by examiner

Fig. 3
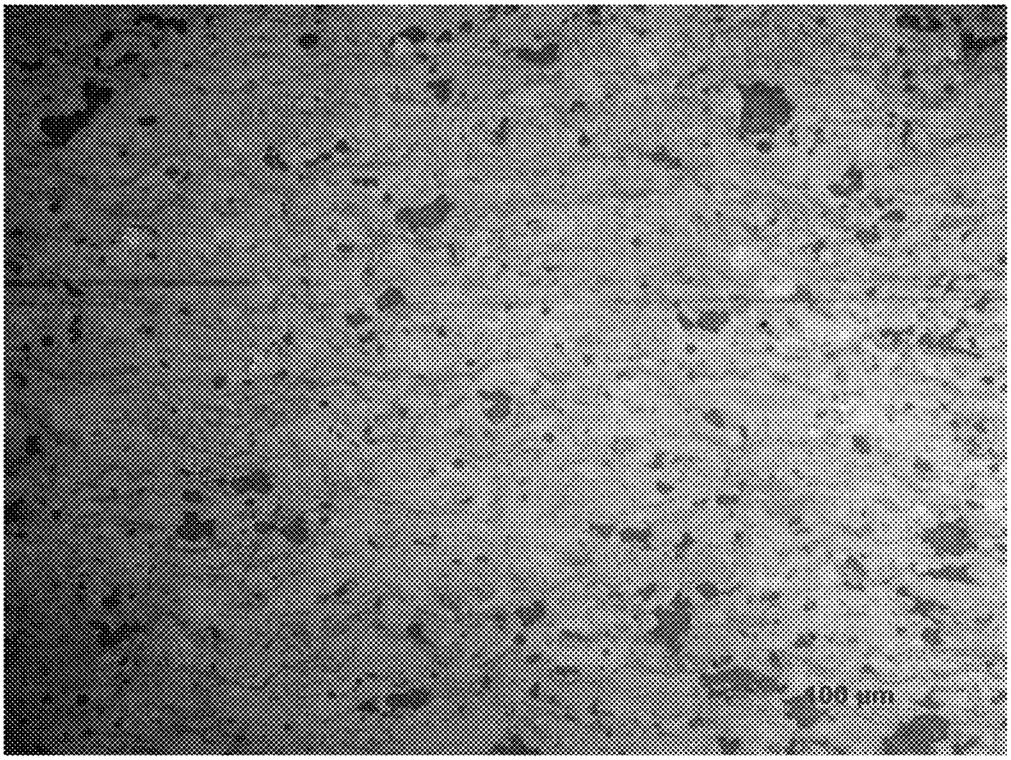
Fig. 4
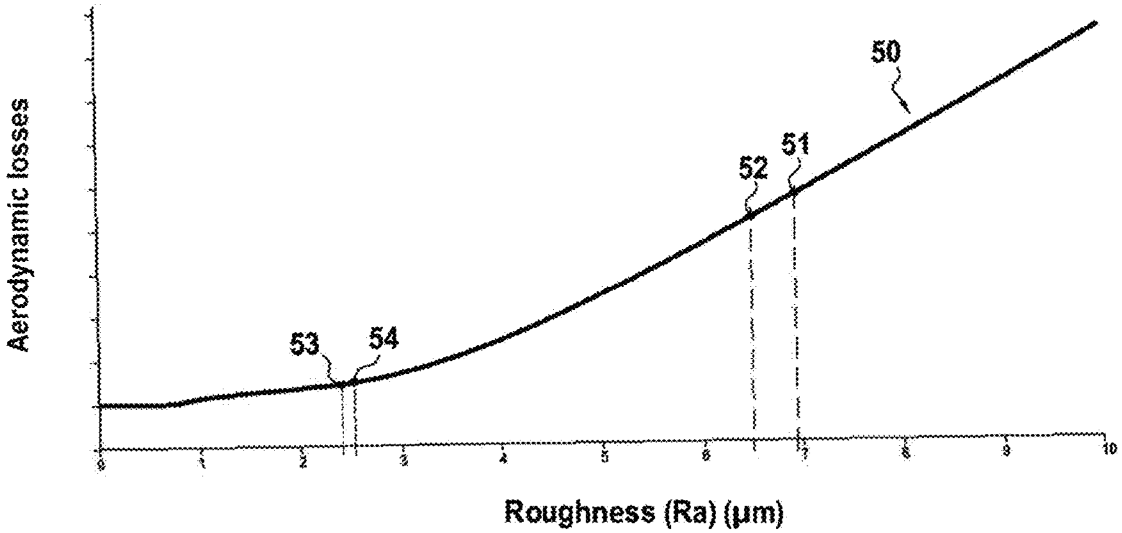
FIG.4

ABRADABLE COATING

CROSS-REFERENCE TO RELATED APPLICATIONS

The present application is the national stage of international application PCT/FR2020/051333, filed on Jul. 22, 2020, and claims the benefit of the filing date of French Appl. No. 1908492, filed on Jul. 26, 2019.

TECHNICAL FIELD

The present disclosure relates to an abradable coating for a turbomachine as well as a turbomachine module and a turbomachine comprising such an abradable coating.

Such an abradable coating can be used in any type of turbomachine, including civil or military turbojet. In particular, it is especially useful in environments subject to very high temperatures.

PRIOR ART

In a number of rotating machines, it is now known to provide the stator ring with abradable tracks opposite the top of the rotor blades. Such tracks are made of "abradable" materials which, when they come into contact with the rotating blades, wear more easily than the latter. A minimum clearance between the rotor and the stator is thus provided, which limits air leakage and thus improves the performance of the rotating machine, without risking damage to the blades in the event of friction between the latter and the stator. In fact, such friction abrades the abradable track, which automatically adjusts the diameter of the stator ring as close as possible to the rotor.

Such abradable tracks can also be provided at the interface between the rotor and the stator vanes to reduce air leakage there as well.

A conventional way to produce such an abradable material is to include porosities in a matrix, metallic for example, which will reduce the tenacity of the coating. Such porosities can for example be created by incorporating and then pyrolyzing polyester fillers. However, these porosities lead to significant surface roughness, which increases the aerodynamic friction coefficient in the boundary layer and thus leads to yield losses.

Another possibility is to incorporate inert fillers with low mechanical strength into the matrix. However, in the current configurations, the materials used for these fillers degrade at high temperature, limiting this option to date to temperature ranges below about 450° C.

Finally, another type of known abradable coating takes the form of a metallic honeycomb structure. However, while this type of coating is more resistant at high temperature, it suffers from abradability, which leads to intense heating on contact and unwanted wear of the rotor.

There is therefore a genuine need for an abradable coating for a turbomachine, as well as a turbomachine module and a turbomachine comprising such an abradable coating, free, at least in part, of the disadvantages inherent in the above-mentioned known configurations.

DISCLOSURE OF THE INVENTION

The present disclosure relates to an abradable coating for a turbomachine comprising, in a content of more than 50% by volume, an inorganic compound with a Mohs hardness of less than 6 and a melting temperature of greater than 900° C., preferably greater than 1000° C.

In the present disclosure, an "inorganic compound" is understood to mean a solid compound having an ordered atomic structure and a defined chemical composition. In particular, such an inorganic compound may have a crystal structure characterized by the arrangement of its atoms according to a given periodicity and symmetry (crystal system and space group of the inorganic compound).

In the present disclosure, unless otherwise specified, the terms "less than" and "greater than" should be understood in the broad sense, i.e., as meaning "less than or equal to" and "greater than or equal to", respectively.

Such an inorganic compound offers a very good abradability while benefiting from a lower surface roughness than the usual abradable coatings. Thus, in particular, it is possible to obtain a roughness Ra of less than 3 μm. Therefore, this coating generates much lower aerodynamic losses than typical coatings.

Moreover, such an inorganic compound has an intrinsic abradable character so that it is unnecessary to artificially incorporate porosities within the coating. Consequently, the surface roughness of the coating remains substantially the same, even after it has been scraped during operation of the turbomachine. As a result, the roughness of the coating, and therefore the aerodynamic losses, remain under control throughout the service life of the coating.

This abradable coating also benefits from stability at very high temperature, which makes it suitable for turbomachine modules exposed to the highest temperatures, in particular the high-pressure compressor or the turbines.

Furthermore, the abrasion debris is inert, which reduces its impact on the downstream part of the turbomachine. Such a coating reduces the risk of clogging the cooling channels of the module.

Finally, it should be noted that such an abradable coating is less expensive to produce than the typical abradable coatings while offering equally wide machining possibilities.

In certain embodiments, the content of said inorganic compound is greater than 55% by volume, preferably greater than 60% by volume.

In certain embodiments, the abradable coating has a porosity of less than 15%. "Porosity" is understood to mean the ratio of the volume of voids present in the material to the total volume of the material. With such reduced porosity, the roughness of the coating is reduced, even without surface treatment, which limits aerodynamic losses.

In certain embodiments, the surface roughness Ra is less than 3 μm. The inventors have indeed observed that the aerodynamic losses remain reasonable below this threshold and then increase more strongly above this threshold.

In certain embodiments, the inorganic compound is stable at least up to 900° C. and preferably up to 1000° C. "Stable" is understood to mean that the compound does not undergo a change in physical state (melting or phase transformation, for example) or chemical transformation (oxidation, for example) when brought to the temperature under consideration from room temperature.

In certain embodiments, the inorganic compound comprises an alkaline-earth element, preferably calcium.

In certain embodiments, the inorganic compound is selected from:

$Ca_{10}(PO_4)_6(OH)_2$, $LaPO_4$; and diatomaceous earth. These compounds are stable up to at least 900° C. and have a hardness suitable to provide satisfactory abradability while exhibiting low roughness.

In certain embodiments, the inorganic compound constitutes at least 95% by volume, preferably at least 99% by volume, of the abradable coating material. Of course, it is not intended here to take into account the porosity of the material in defining the composition of the material. The inventors have indeed observed during their experiments that such an inorganic compound alone provides the properties expected for a turbomachine abradable, without it necessarily being necessary to add another compound.

However, in other embodiments, the abradable coating further comprises a metal compound. This metal compound forms a matrix for the inorganic compound. This improves the erosion resistance of the coating.

In certain embodiments, this metal compound is selected based on the application temperature.

In certain embodiments, the metal compound is based on nickel, cobalt or iron.

In certain embodiments, the metal compound is selected from: NiAl; NiCrAl; CoNiCrAlY, and FeCrAlY.

In certain embodiments, the inorganic compound and the metal compound together constitute at least 95% by volume, preferably at least 99% by volume, of the abradable coating material.

The present disclosure also relates to a turbomachine module, comprising a rotor, provided with a plurality of moving blades a stator, and at least one abradable coating according to any of the preceding embodiments provided at the interface between a portion of the rotor and a portion of the stator.

In certain embodiments, at least one such abradable coating forms an abradable track provided on a stator shroud opposite the rotor blades.

In certain embodiments, the stator is provided with a plurality of fixed vanes.

In certain embodiments, at least one such abradable coating forms an abradable track provided at the inner end of the stator vanes opposite knife edges carried by the rotor.

In certain embodiments, the module is a high-pressure compressor or a low-pressure turbine for turbomachinery.

The present disclosure also relates to a turbomachine, comprising a module according to any of the preceding embodiments.

The above features and advantages, as well as others, will emerge from the following detailed description of example embodiments of the proposed abradable coating and module. This detailed description refers to the appended drawings.

BRIEF DESCRIPTION OF THE DRAWINGS

The appended drawings are schematic and are intended primarily to illustrate the principles of the disclosure.

In these drawings, from one figure to another, identical elements (or parts of elements) are marked with the same reference signs.

FIG. 3 is a photograph illustrating the microstructure of a first example coating according to the disclosure.

FIG. 4 is a graph showing the aerodynamic losses within a module as a function of the roughness of the abradable coating.

DESCRIPTION OF THE EMBODIMENTS

To make the disclosure more concrete, an example of an abradable coating is described in detail below, with reference to the appended drawings. It should be recalled that the invention is not limited to this example.

Figure 1:
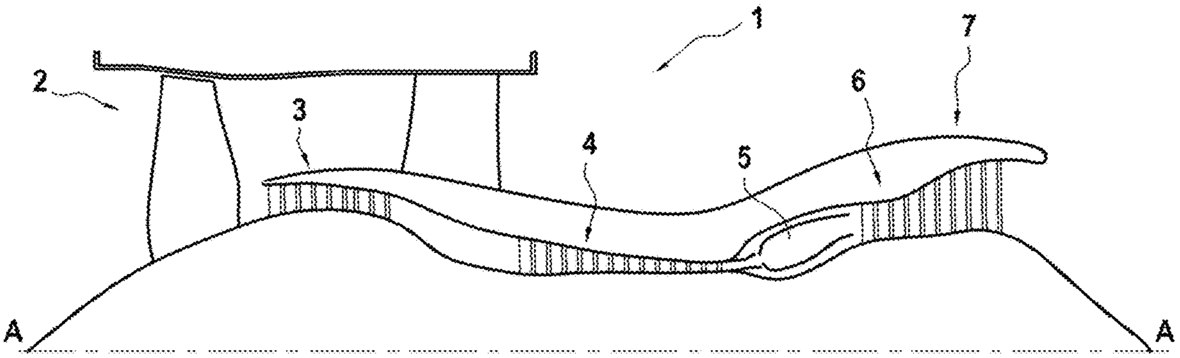
FIG. 1 is an axial cross-sectional view of a turbomachine according to the disclosure.

FIG. 1 shows, in cross-section along a vertical plane passing through its main axis A, a turbofan engine 1, constituting an example of a turbomachine according to the disclosure. It comprises, from upstream to downstream according to the air flow, a fan 2, a low-pressure compressor 3, a high-pressure compressor 4, a combustion chamber 5, a high-pressure turbine 6, and a low-pressure turbine 7.

Figure 2:
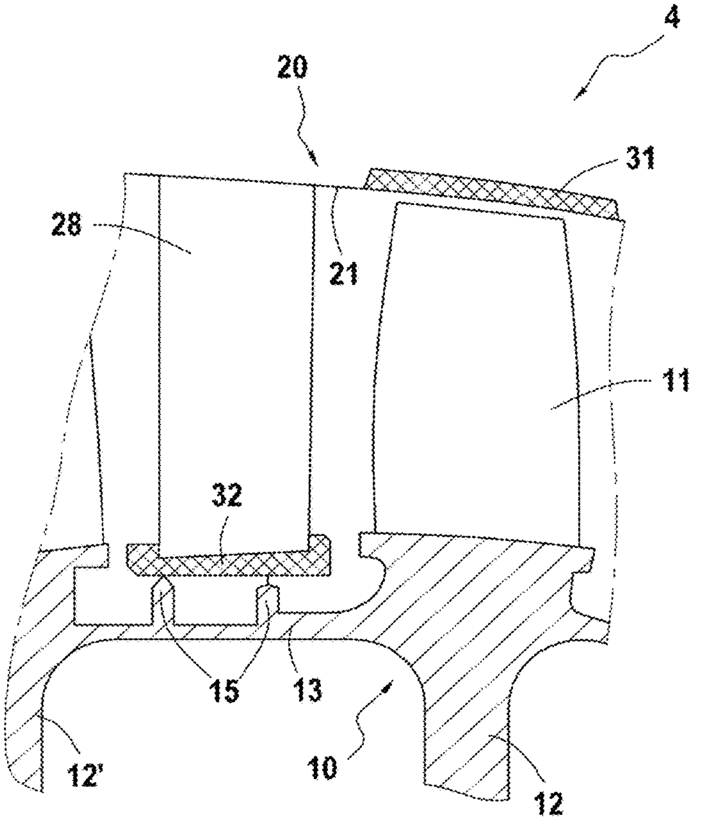
FIG. 2 is a cross-sectional view of a module according to the disclosure.

FIG. 2 shows, schematically, a stage of the high-pressure compressor 4, the high-pressure compressor 4 comprising a succession of such stages.

The rotor 10 of each stage comprises a plurality of moving blades 11, mounted on a disk 12 coupled to the high pressure shaft of the turbomachine 1. In addition, a shroud 13 connects the disk 12 to the disk 12' of the previous stage. The stator 20 of each stage comprises a shroud 21, provided opposite the moving blades 11, and a plurality of fixed blades 22 provided opposite the shroud 13 of the rotor 10.

The stator shroud 21 carries abradable tracks 31 against which the external ends of the moving blades 11 rub. Furthermore, another abradable track 32 is provided on the inner end of each fixed blade 22; knife edges 15 provided on the rotor shroud 13 then rub against this abradable track 32.

Examples of abradable coatings to form these abradable tracks 31 and 32 will now be described.

In a first example, the abradable coating is made of hydroxyapatite, an inorganic compound of the formula $Ca_{10}(PO_4)_6(OH)_2$. Except for possible impurities, this abradable coating does not comprise any other component.

This inorganic compound has a hexagonal crystal system and a 6/m space group. It is stable up to at least 900° C. and has a hardness of 5 on the Mohs scale. Furthermore, it is insoluble in water, acetone and alcohol.

It is deposited by thermal spraying on the substrate to be coated, in this case the shroud 21 and the ring 32, from a powder with a particle size between 45 and 90 μm. In this example, a thickness of 1.5 mm is desired for the coating.

After surface machining, a coating whose microstructure is visible on FIG. 3 is obtained: its porosity is lower than 15% and its roughness Ra lower than 3 μm.

Figure 5:
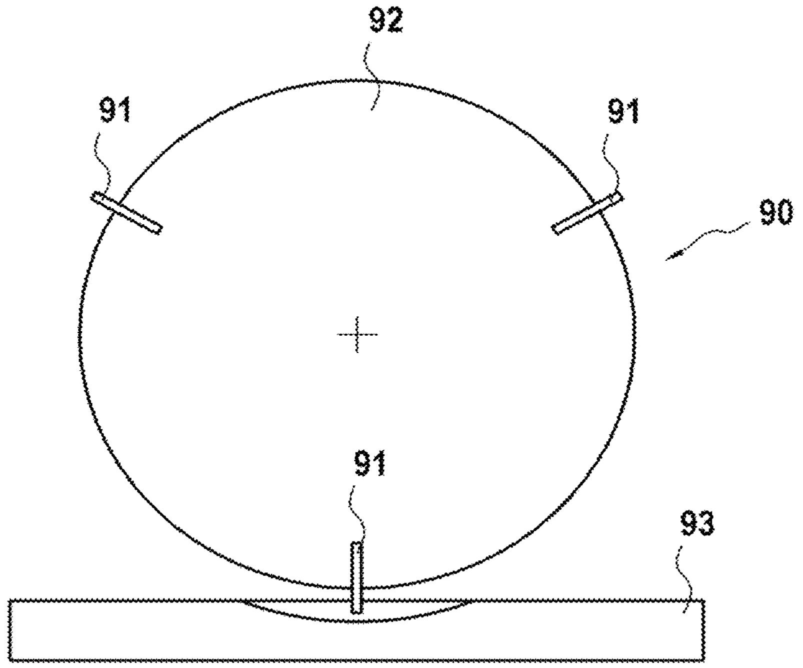
FIG. 5 shows a schematic illustration of an abradability test.

In this respect, FIG. 5 represents the aerodynamic losses suffered by the air stream circulating in a high-pressure compressor equipped with abradable tracks, as a function of the roughness of the coating forming these abradable tracks. This curve 50 was drawn by comparing several materials on a test bench. Points 51 and 52 correspond to the cases of two abradable coatings currently preferred for a high-pressure compressor: a raw Metco 2043 coating for point 51 and a Metco 2043 coating with an alumina slurry for point 52.

The point 53 corresponds to the case of this coating made of hydroxyapatite: it can be seen that this coating has a roughness about three times lower than that of the known Metco 2043 coatings and therefore causes almost half the aerodynamic losses of these coatings of the state of the art.

Furthermore, the performance of this abradable coating was evaluated using the A/O ratio (abradability to overpenetration) which is measured using a measuring device 90 shown in FIG. 6: three simulated vanes 91 are arranged protruding from the perimeter of a rotating wheel 92. An abradable sample 93 to be tested is placed below the rotating wheel 92. The rotating wheel 92 advances at a constant speed towards the abradable sample 93 and penetrates it to a set depth. The actual depth dug into the abradable is then measured and the ratio of set depth to dug depth is calculated. This ratio is called the NO ratio and is expressed as a percentage. The test parameters are as follows. The rotation speed at the end of the simulacrum blades 91 is 210 m/s, the feed speed of the rotating wheel 92 towards the sample 93 is 150 μm/s and the set depth is 0.5 mm.

Therefore, this hydroxyapatite coating showed during these tests an NO ratio comprised between 110% and 120%, without any wear on the blades.

In addition, an erosion test according to standard ASTM G76 was performed on this abradable coating. An erosion of 1.7 $mm^3/g$ for an angle of 90° was then measured for this hydroxyapatite coating.

Although the present invention has been described with reference to specific example embodiments, it is apparent that modifications and changes may be made to these examples without departing from the general scope of the invention as defined by the claims. In particular, individual features of the various illustrated/mentioned embodiments may be combined in additional embodiments. Consequently, the description and drawings should be considered in an illustrative rather than restrictive sense.

It is also obvious that all the features described with reference to a process are transposable, alone or in combination, to a device, and conversely, all the features described with reference to a device are transposable, alone or in combination, to a process.

The invention claimed is:

1. An abradable track suitable for a turbomachine, the abradable track comprising:
- a substrate; and
- abradable coating, provided on the substrate;
- wherein the abradable coating comprises, in a content of greater than 95 vol. %, $Ca_{10}(PO_4)_6(OH)_2$, $LaPO_4$, or diatomaceous earth, and
- wherein the abradable coating has a surface roughness Ra of less than 3 μm.

2. The abradable track of claim 1, wherein the abradable coating has a porosity of less than 15%.

3. The abradable track of claim 1, wherein the abradable coating further comprises a metal compound.

4. The abradable track of claim 3, wherein the metal compound is based on nickel, cobalt, or iron.

5. The abradable track of claim 3, wherein the metal compound is NiAl.

6. The abradable track of claim 3, wherein the $Ca_{10}(PO_4)_6(OH)_2$ and the metal compound together constitute at least 99 vol. % of total abradable coating material.

7. A turbomachine module, comprising:
- a rotor, provided with a plurality of moving blades;
- a stator; and
- the abradable track of claim 1, provided at the interface between a portion of the rotor and a portion of the stator.

8. A turbomachine, comprising:
- a module of claim 7.

9. A process for manufacturing the abradable track of claim 1, the process comprising:
- depositing the $Ca_{10}(PO_4)_6(OH)_2$, $LaPO_4$, or diatomaceous earth by thermal spraying from a powder having a particle size in a range of from 45 to 90 μm; and
- surface machining the abradable coating.

10. The abradable track of claim 1, wherein the abradable coating further comprises NiCrAl.

11. The abradable track of claim 1, wherein the abradable coating further comprises CoNiCrAlY.

12. The abradable track of claim 1, wherein the abradable coating further comprises FeCrAlY.

13. The abradable track of claim 1, wherein the abradable coating comprises the $LaPO_4$.

14. The abradable track of claim 1, wherein the abradable coating comprises the diatomaceous earth.

15. The abradable track of claim 1, wherein the $Ca_{10}(PO_4)_6(OH)_2$ is at least 99 vol. % of the abradable coating.

16. The abradable track of claim 1, wherein the abradable coating consists of the $Ca_{10}(PO_4)_6(OH)_2$ and possible impurities.

17. The abradable track of claim 1, wherein the $LaPO_4$ is at least 99 vol. % of the abradable coating.

18. The abradable track of claim 1, wherein the abradable coating consists of the $LaPO_4$ and possible impurities.

19. The abradable track of claim 1, wherein the diatomaceous earth is at least 99 vol. % of the abradable coating.

20. The abradable track of claim 1, wherein the abradable coating consists of the diatomaceous earth and possible impurities.

21. The abradable track of claim 1, wherein the abradable coating has a porosity of less than 15%, and
- wherein the $Ca_{10}(PO_4)_6(OH)_2$ is greater than 95 vol. % of the abradable coating.

* * * * *